(12) United States Patent
Abroy et al.

(10) Patent No.: US 6,179,144 B1
(45) Date of Patent: Jan. 30, 2001

(54) ELECTRICAL ENCLOSURE

(75) Inventors: Hamid S. Abroy; William K. Chambers; Norman M. Newsome; Gary H. Dodier, all of Lexington, KY (US)

(73) Assignee: Square D Company, Palatine, IL (US)

( * ) Notice: Under 35 U.S.C. 154(b), the term of this patent shall be extended for 0 days.

(21) Appl. No.: 09/106,193

(22) Filed: Jun. 26, 1998

(51) Int. Cl.[7] ................................................... B65D 51/10
(52) U.S. Cl. .................... 220/3.8; 220/4.02; 220/324; 220/3.2
(58) Field of Search .................... 220/3.8, 4.02, 220/324, 3.94, 3.2

(56) References Cited

U.S. PATENT DOCUMENTS

| | | | |
|---|---|---|---|
| 3,912,348 | * 10/1975 | Seymour | 312/100 |
| 3,955,709 | * 5/1976 | Coley et al. | 220/3.8 |
| 4,102,475 | * 7/1978 | Kalvaitis | 220/3.8 |
| 4,484,692 | * 11/1984 | Palermo et al. | 220/3.8 |
| 4,502,609 | * 3/1985 | Christatos | 220/3.8 |
| 4,890,318 | * 12/1989 | Crane et al. | 379/399 |
| 5,148,348 | * 9/1992 | White | 220/3.8 |
| 5,499,734 | * 3/1996 | Tessmer | 220/3.8 |
| 5,669,522 | * 9/1997 | Million et al. | 220/4.02 |

* cited by examiner

Primary Examiner—Joseph M. Moy
(74) Attorney, Agent, or Firm—David R. Stacey; Larry T. Shrout; Larry I. Golden (57) ABSTRACT

A weatherproof enclosure 10 with a side hinged cover 36 having a screwless cover latching means 52, which is not defeated by the pressure of expanding internal gases, is disclosed. The enclosure 10 includes a rain channel 76 located immediately adjacent a front edge of the box top 28. The rain channel 76 is generally J-shaped in cross-section and extends across the front of the box 14 and slightly beyond the two side walls 18 and 22 of the box 14 such that any liquid being received within the rain channel 76 will be directed over the side walls 18 and 22 of the box 14. The rain channel 76 cooperates with a downwardly extending flange 40 along the front edge of the box top 28 and an inwardly extending flange 60 along the top of the side hinged cover 36 to prevent the ingress of liquid at the top of the cover 36. Inwardly facing flanges 68 and 72 along the sides of the hinged cover 36 overlap the side walls 18 and 22 of the box 14 to prevent the ingress of liquid along each side of the cover 36. The cover latch 52 is positioned outside the side wall 18 or 22 of the box 14 such that the corresponding latching slot 56 in the cover 36 is also outside the box side wall 18 or 22, thus preventing the ingress of liquid through the latching slot 56. The configuration of the cover 36, latch 52 and the latching slot 56 is such that pressure exerted on the inside surfaces of the enclosure 10 causes a positive latching effect between the cover 36 and the latch 52.

26 Claims, 12 Drawing Sheets

ELECTRICAL ENCLOSURE

FIELD OF THE INVENTION

The present invention relates to electrical enclosures, and particularly to weatherproof electrical enclosures with side hinged covers.

BACKGROUND OF THE INVENTION

Electrical enclosures for exterior applications are required to prohibit the ingress of liquids in the form of dripping water of driven rain above the lowest point of the enclosed electrical devices. When the enclosure provides protection for electrical switches, circuit breakers or other circuit protection devices which produce gases during abnormal conditions (short circuit conditions), the enclosure cover must be sufficiently restrained to prohibit forced opening by the pressure of those gasses. Generally, enclosures providing these features have employed top hinged covers that rotate upward with overlapping drip flanges on the enclosure top and screw type fasteners, or screw attached covers with overlapping drip flanges on the enclosure top. A weatherproof electrical enclosure manufactured by Murray Electrical Products, a division of Siemens Energy & Automation, Inc., employs a side-hinged cover. The Murray cover operates in a manner similar to a top hinged enclosure in that the cover must be raised after closing such that the top edge of the cover will be positioned behind the overlapping drip flange on the enclosure top. A latch attached to the bottom of the enclosure engages a flange along the bottom of the cover to hold the cover in the raised position. Other weatherproof side-hinged covers are known, however, most require some type of gasketing or sealing to prevent the ingress of liquids. Sealing of the enclosure can cause deformation of the enclosure and/or opening of the cover due to pressure from gasses produced by the operating circuit protection devices inside the enclosure. U.S. patent application Ser. No. 08/942,343, filed on Oct. 1, 1997, assigned to the present assignee and incorporated herein by reference, teaches a side hinged weatherproof enclosure. The methods of preventing the ingress of liquid disclosed in the above patent application are most effective on small enclosures such as air-conditioner disconnect switches. The cover latching means disclosed therein is not intended to prevent the cover from being forced open by the pressure of expanding internal gasses. It would therefore be desirable to have a simple means of preventing the ingress of liquids into an electrical enclosure, which does not require a sealing means. It is further desirable to provide a cover latching means, other than screws, which will maintain the integrity of the cover while allowing gasses produced by circuit protection devices to escape without causing significant damage to the enclosure. It would be most desirable to incorporate these features in an enclosure with a side-hinged cover.

SUMMARY OF THE INVENTION

The present invention provides a weatherproof enclosure with side hinged cover and a screwless cover latching means which is not defeated by the pressure of expanding internal gases. The enclosure includes a rain channel located immediately adjacent a front edge of the box top. The rain channel is generally J-shaped in cross-section and extends across the front of the box and slightly beyond the two side walls of the box such that any liquid being received within the rain channel will be directed over the side walls. The rain channel cooperates with a downwardly extending flange along the front edge of the box top and an inwardly extending flange along the top of the side hinged cover to prevent the ingress of liquid at the top of the cover. Inwardly facing flanges along the sides of the hinged cover overlap the side walls of the box to prevent the ingress of liquid along each side of the cover. The cover latch is positioned approximately at the center of the cover side such that the corners of the cover can flex slightly to relieve the inside pressure caused by circuit protection devices operating in response to a short circuit. Since the cover latch and its latching slot are positioned above the lowest point of live electrical components inside the enclosure, the latch and latching slot must be weatherproof. Therefore, the cover latch is positioned outside the side wall of the box such that the corresponding opening in the cover is also outside the box side wall thus preventing the ingress of liquid through the latch opening. The configuration of the cover latch and the latch opening is such that pressure exerted on the inside surfaces of the enclosure causes a positive latching effect between the cover and the latch.

Before one embodiment of the invention is explained in detail, it is to be understood that the invention is not limited in its application to the details of construction and description or as illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

Figure 1:
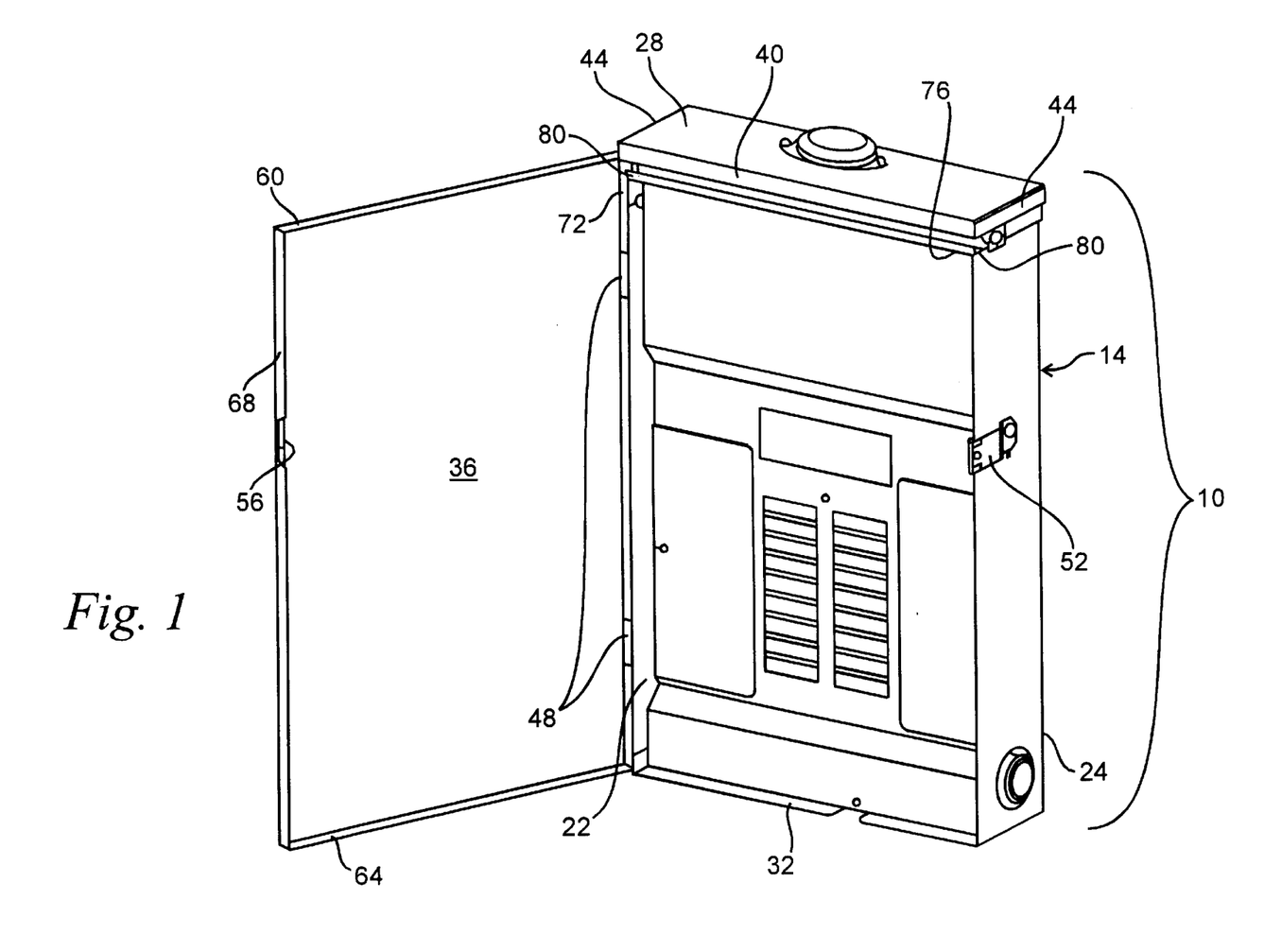
FIG. 1 illustrates a weatherproof electrical enclosure assembled in accordance with the present invention.

FIG. 1 illustrates a weatherproof enclosure in accordance with the present invention and generally indicated by reference numeral 10. The enclosure 10 includes a box 14 having first and second generally parallel side walls, 18 and 22 respectively, spaced apart by a generally planer back 24. Attached to the box 14 are a top 28, a bottom 32 and a cover 36. The top 28 includes a front flange 40 and two side flanges 44, each extending downwardly, the side flanges 44 overlapping the side walls 18 and 22. The cover 36 is attached to the box 18 by hinges 48 attached to one of the first or second side walls, 18 or 22, respectively, and is held in the fully closed position by a latch 52 attached to the other of the first and second side walls, 18 or 22, respectively. The latch 52 cooperates with a latching slot 56 in the cover 36 to retain the cover 36 in the fully closed position. The cover 36 includes a top flange 60, a bottom flange 64, and first and second side flanges, 68 and 72, respectively. Each of the flanges 60, 64, 68, and 72 are integrally formed from the cover 36 at a right angle to the surface of the cover 36 and extend and generally toward the box 14 when the cover is in the closed position. A rain channel 76, having a generally J-shaped cross-section, is attached to the box side walls, 18 and 22, respectively, at their top outside corners. The ends 80 of the rain channel 76 extend slightly to the outside of the box side walls, 18 and 22, respectively.

Figure 2:
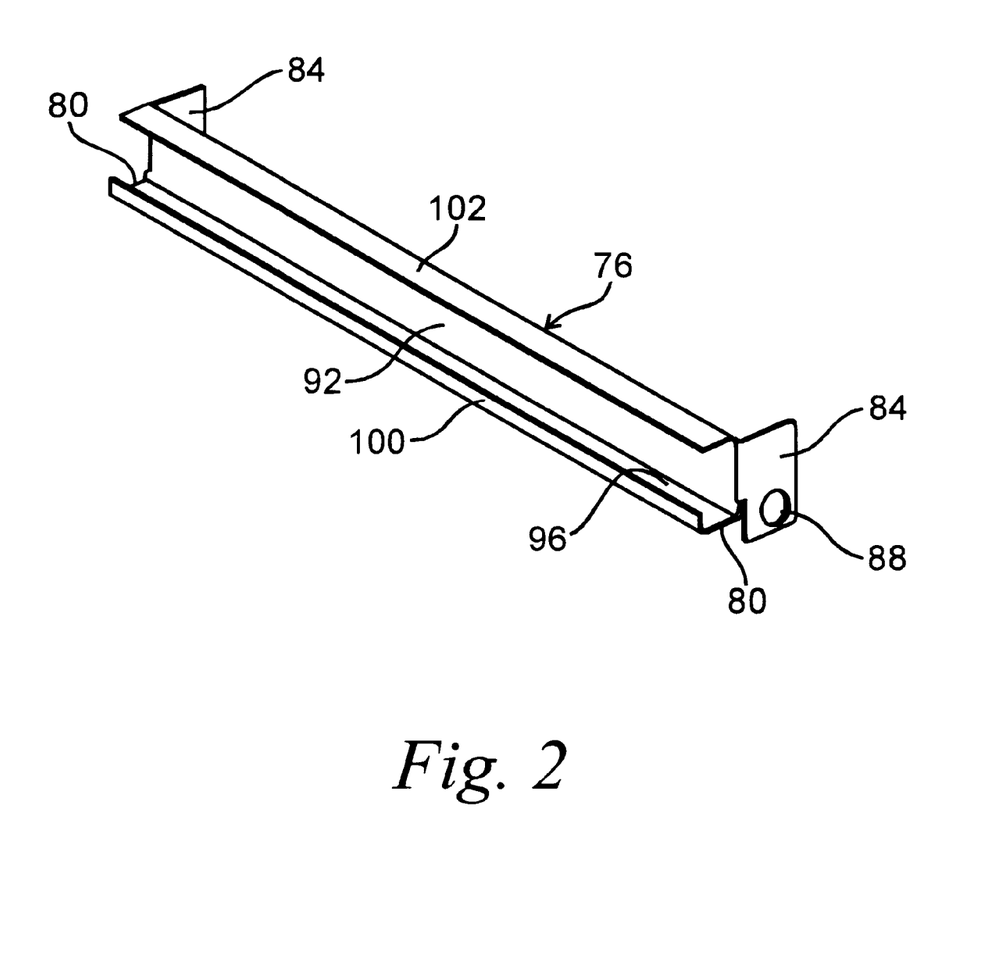
FIG. 2 is an isometric drawing of the rain channel in accordance with the present invention.

Referring now to FIG. 2, a detailed illustration of the rain channel 76 is shown. The rain channel 76 includes an attaching tab 84 extending from each end 80 generally at a right angle to the longitudinal dimension of the rain channel 76. Each attaching tab 84 includes a weld dimple 88 formed inwardly to compensate for the dimension by which each end 80 extends past the box side walls, 18 and 22, respectively. The J-shaped cross-section includes a back wall 92, a bottom 96 and an upwardly extending lip 100. A top flange 102 is optional but helps to prevent any liquid directed upwardly with significant force from entering the enclosure 10.

Figure 3:
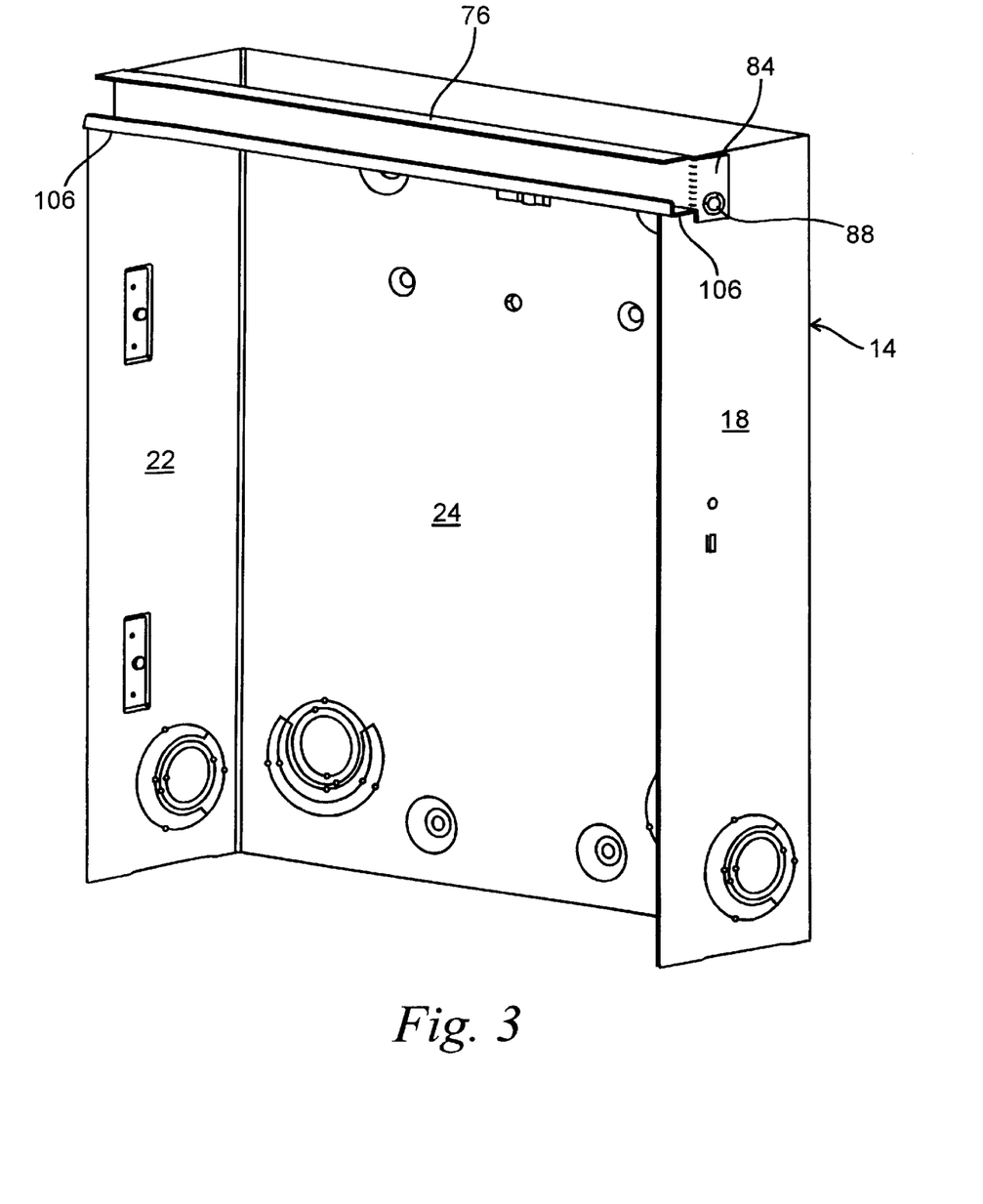
FIG. 3 is an isometric view of the enclosure box with the rain channel installed.

Referring now to FIG. 3, the rain channel 76 is shown attached to the box 14. A notch 106, dimensioned to snugly receive the rain channel 76, is cut in the uppermost outside corner of each box side wall, 18 and 22. The attaching tabs 84 extend toward the back of the box 14 over the outside surface of the side walls 18 and 22. The inwardly formed dimples 88 are in contact with the outside surface of the side walls, 18 and 22, such that the proper dimension between the rain channel ends 80 and the side walls, 18 and 22, is maintained. The dimples 88 also provide a good welding surface.

Figure 4:
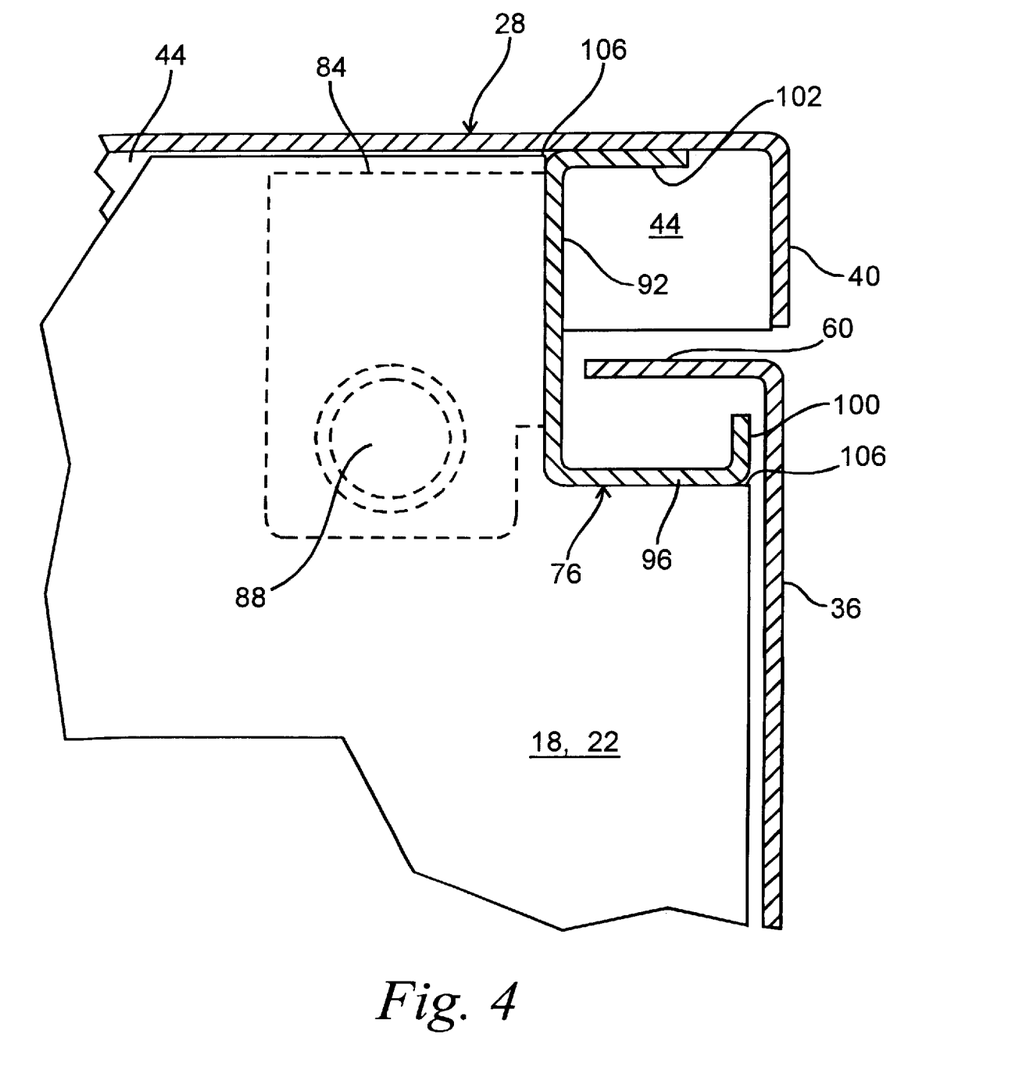
FIG. 4 is cross-section view of the weatherproof enclosure of the present invention illustrating the relationship of the rain channel, enclosure cover, enclosure top and enclosure side walls when the cover is in the closed and latched position.

Referring now to FIG. 4, the relationships of various parts of the box top 28, rain channel 76 and closed and latched cover 36 are best shown in a sectional view. It can be seen that the rain channel 76 is snugly received within the notch 106. The top 28 and its front flange 40 extend out over the rain channel 76 and slightly past the outside surface of the cover 36. The top flange 60 of the cover extends into a gap between the front flange 40 of the top 28 and the upwardly extending lip 100 of the rain channel 76. Thus any liquids falling on or dripping from the top 28 will be directed outwardly over the outside surface of the cover 36. Any liquid which might be blown or otherwise directed in an upward direction into the gap between the front flange 40 of the top 28 and the top flange 60 of the cover will be directed over the outside surface of the side walls, 18 and 22, by the J-shaped rain channel 76. Any liquid entering the rain channel 76 is prevented from entering the enclosure 10 by the back wall 92 and the upwardly extending lip 100 of the rain channel 76. It can be seen in this illustration that any liquid which might be directed upwardly with significant force and at such an angle that would permit entrance into the rain channel 76 and contact with the upper portion of the back wall 92 would be prohibited from entering the enclosure 10 by the top flange 102 of the rain channel 76.

Figure 5:
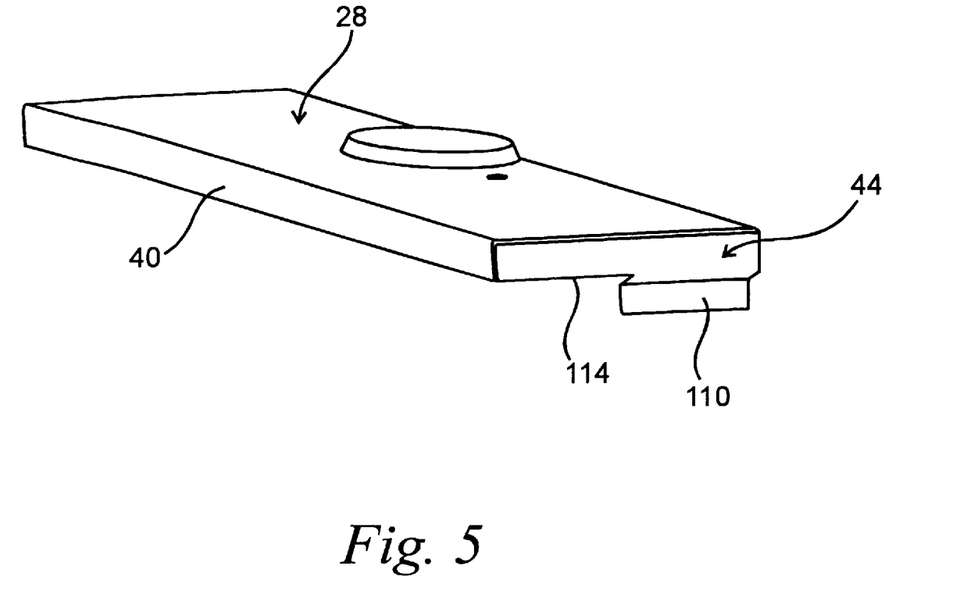
FIG. 5 is an isometric view of a box top in accordance with the present invention.

Referring now to FIG. 5, an illustration of the top 28 is shown. Each side flange 44 includes an inwardly offset portion 110 along the bottom of the side flange 44. The offset allows the flange 44 to extend outwardly past the ends 80 of the rain channel 76. Each side flange 44 also includes a notch 114 at the front end to provide clearance for the weld tabs 84 of the rain channel 76.

Figure 6:
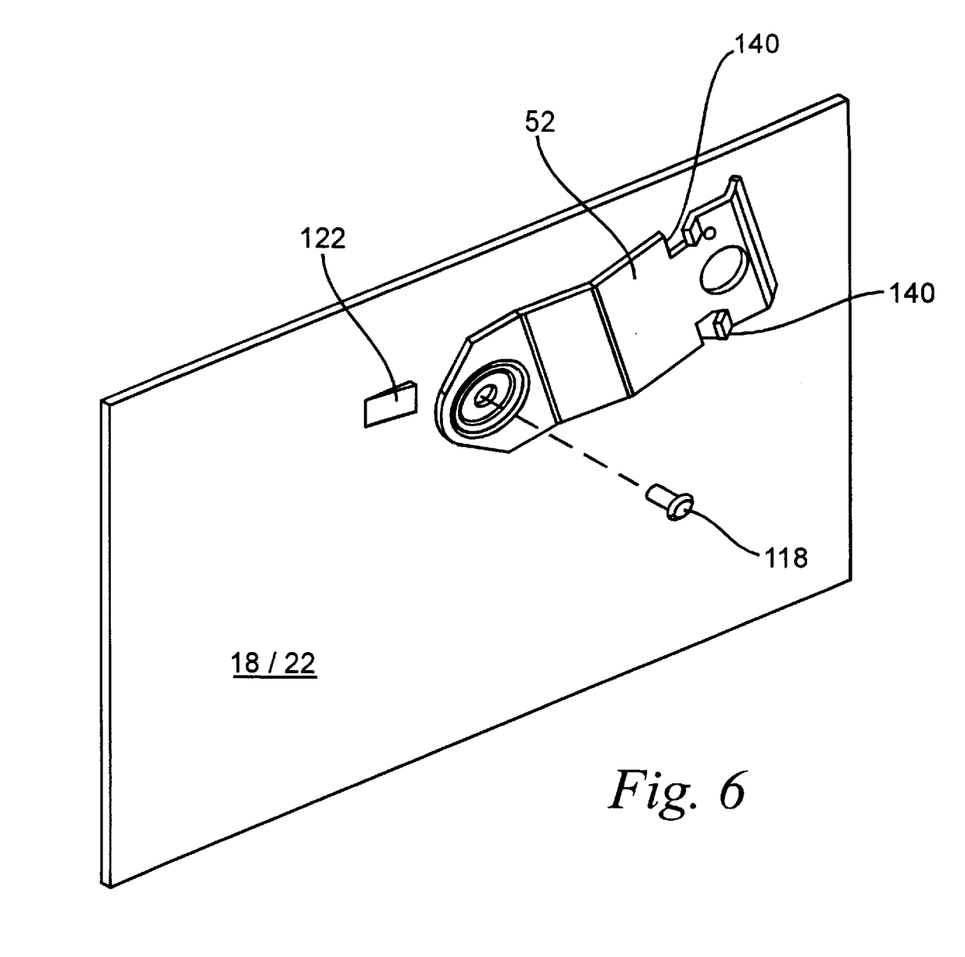
FIG. 6 is an isometric view of the cover latch in its shipping position.
Figure 7:
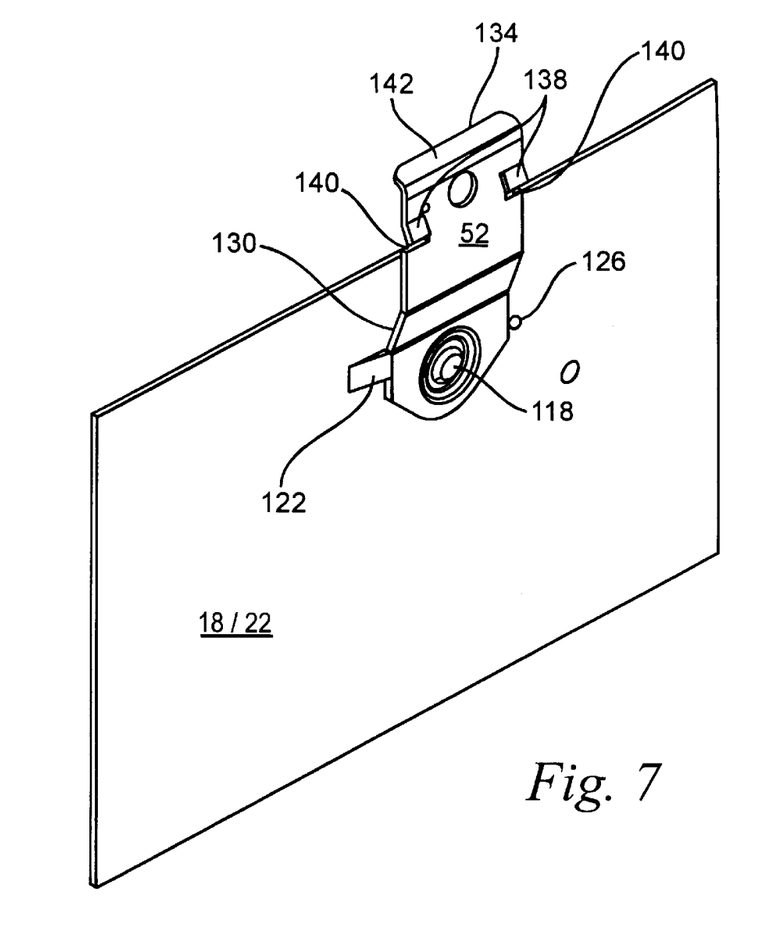
FIG. 7 is an isometric view of the cover latch in its normal position.

Referring now to FIGS. 6 and 7, details of the latch 52 attachment and operation are illustrated. The latch 52 is attached to the outside surface of the box side wall, 18 or 22, by means that will permit the latch 52 to be rotated about the attachment means after installation. It will be noted that the latch 52 is attached to the the side wall 18 or 22 on which the cover 36 is not hinged, i.e. if the cover 36 is hinged on side wall 22, the latch 52 will be attached to side wall 18. In the preferred embodiment, the attachment means is a rivet 118. It is desirable that the latch 52 be rotatable after installation such that it can be placed in a protective position alongside the side wall 18 or 22 for shipping and rotated up into an operating position prior to placing the electrical device in operation. Shipping in the normal operating position can expose the latch 52 to potentially damaging conditions. A stop 122 is integrally formed in the box side wall 18 or 22 and properly positioned such that when rotated into contact with the stop 122, the latch 52 will be in its operating position, as shown in FIG. 7. An additional integrally formed nub 126 can be used to lock the latch 52 in its operating position. The latch 52 also includes an offset 130 which places the extended end 134 of the latch a predetermined distance outward from the box side wall 18 or 22. Two outwardly facing latching ears 138 are provided for engaging a portion of the cover 36 adjacent the latch slot 56 as will be discussed in reference to FIG. 10. Immediately under each latching ear 138 is a small latching notch 140 that extends into the latch 52 a distance equal to the width of the latching ear 138. The extended end 134 is angled inward toward the box side wall 18 or 22 to provide a gliding surface 142 for engagement with the cover 36, as will be discussed in reference to FIG. 8.

Figure 8:
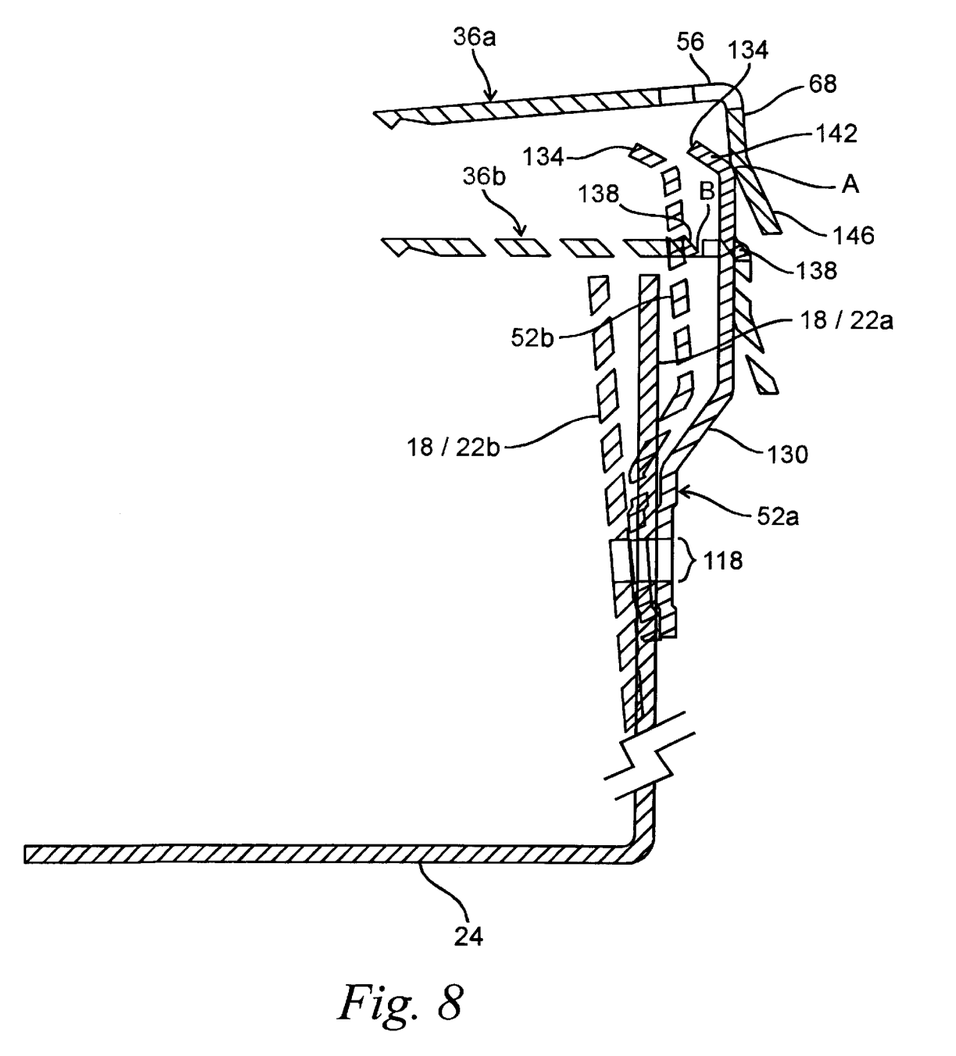
FIG. 8 is an illustration showing the relationship of the cover's latching slot with respect to the box side wall when the cover is being latched and unlatched.

Shown in FIG. 8 is a cross-sectional representation of the mechanical relationships between the box side wall, 18 or 22, latch 52 and cover 36 during closing and opening of the cover 36. In the present state of the art it would be expected to make the latch 52 from spring steel such that it would deflect as the cover 36 is closed and opened. Latches made of spring steel are expensive due to the cost of the spring steel rawstock and the heat treating, pasivating and plating processes that must be performed to give the rawstock its spring qualities. The latches 52 of the present invention are not required to deflect during the closing and opening of the cover 36 and therefore are not made of expensive spring steel. The preferred material for the latch 52 of the present invention is stainless steel that is significantly strong to resist deflection and needs no corrosion protection. In this illustration, reference numerals with an "a" suffix indicate the position of that element at the beginning of the cover latching operation or the end of the cover unlatching operation. Reference numerals with a "b" suffix indicate those elements at the point just before latching of the cover or at the beginning of the unlatching operation and those elements are illustrated in dashed lines. As the cover 36 is closed, a flared portion 146 of the flange 68 adjacent the latching slot 56 engages the angled gliding surface 142 of the latch 52, as shown at reference point A. Since the latch 52 does not deflect, the box side wall 18 or 22 must perform this function. As the box side wall 18 or 22 deflects, the flared portion 146 of flange 68 and the gliding surface 142 of latch 52 continue to slidingly pass by each other until the extended end 142 of the latch 52 enters the latching slot 56 and the latching ears 138 passes through the latching slot 56 at reference point B.

Figure 9:
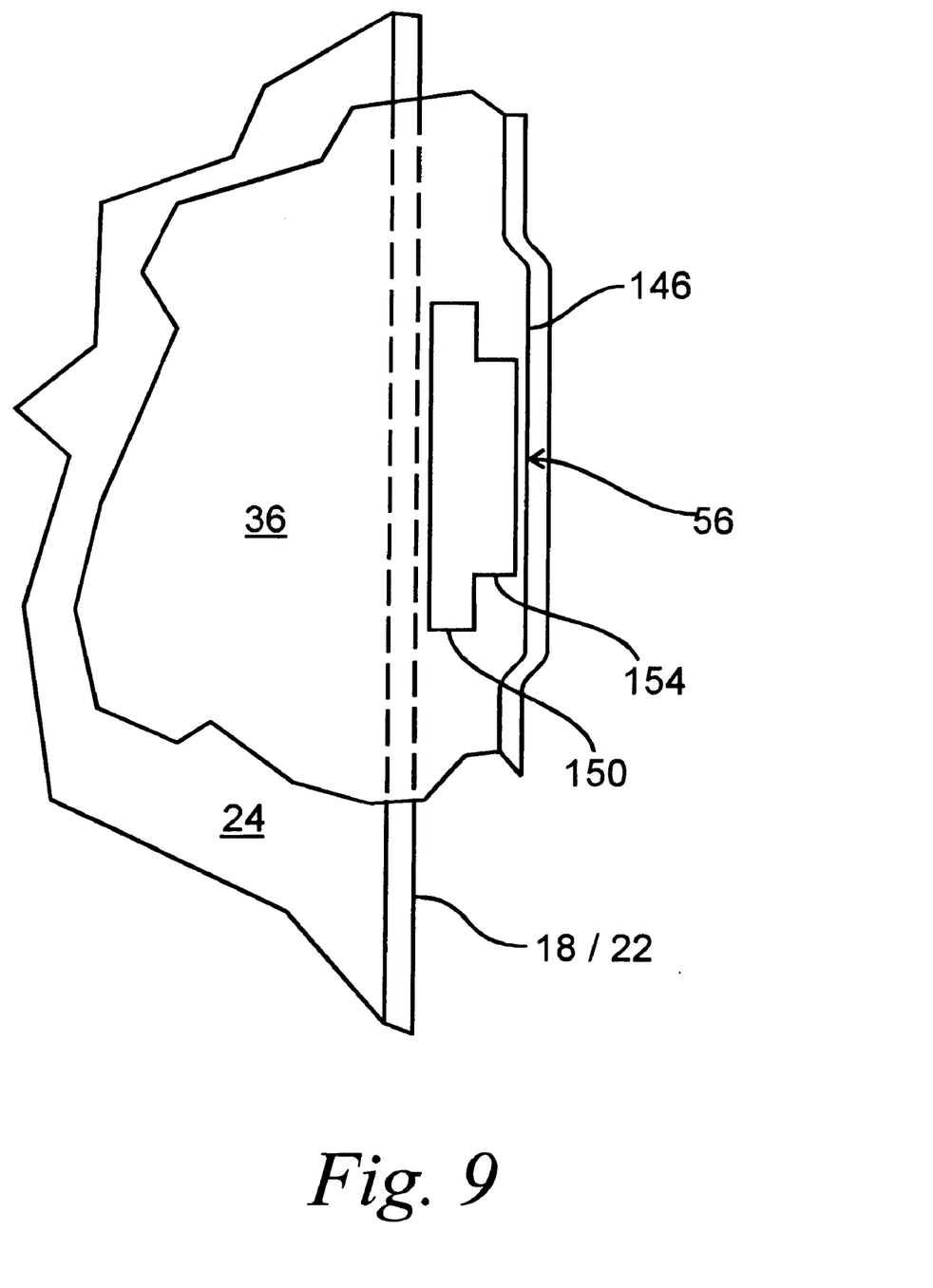
FIG. 9 is a partial section view of the box and cover illustrating the relationships of the box side wall, cover and cover latch during the closing of the cover.

FIG. 9 illustrates the relationship of the latching slot 56 to the box side wall 18 or 22 when the cover 36 is closed. As can be seen in the illustration, the latching slot 56 is outside the box side wall 18 or 22, thus preventing any liquid passing through the latching slot 56 from entering the enclosure 10. The non-deflecting latch 52 helps to maintain this relationship by causing the side wall 18 or 22 to deflect inward from the latching slot 56 by at least the dimension of the latch offset 130. Also shown in this illustration is the configuration of the latching slot 56 which includes a wide section 150 and a narrow section 154 giving the latching slot a T-shaped appearance.

Figure 10:
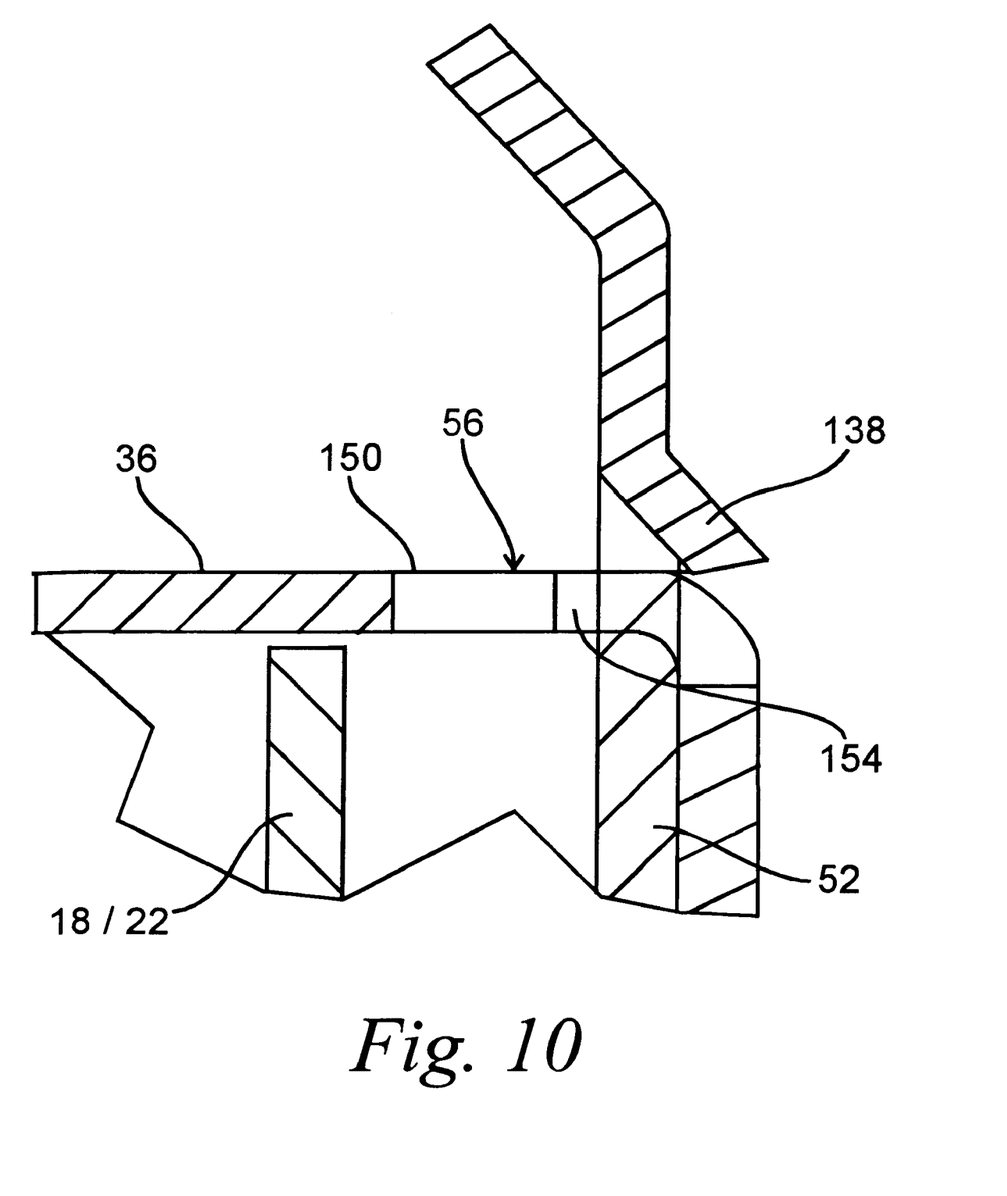
FIG. 10 is cross-section taken through the latch showing the relationship of the cover, box side wall and latch when the cover is closed and latched.

Referring now to FIG. 10, the closed cover relationships of the latch 52 to the latching slot 56 are shown in cross-section. As the cover 36 is closing, the latch 52 passes through the wide section 150 of the latching slot 56. When the cover 36 is completely closed, the latching notches 140 under the latching ears 138 on each side of the latch 52 permit the latch 52 to slide into the narrow section 154 of the latching slot 56.

Figure 11:
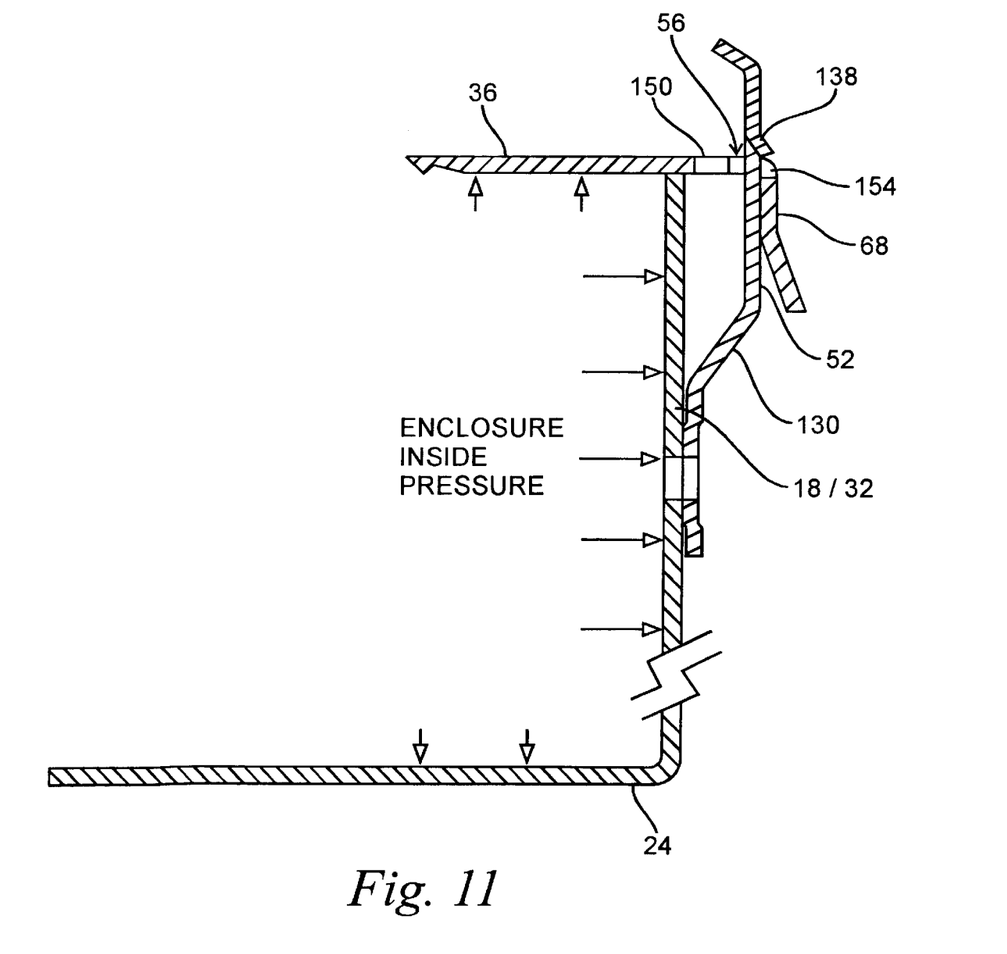
FIG. 11 is a partial cross-section view illustrating the effect of internal gas pressure exerted against the inside of the box with respect to the latching of the cover.

FIG. 11 illustrates how gas pressure inside the enclosure 10 and pressing against the box side wall 18 or 22 causes the latch 52 to be forced into the narrow section 154 of the latching slot 56 to ensure that the latching ears 138 will engage the cover 36 thus providing a positive latch which prevents the cover 36 from opening.

Figure 12:
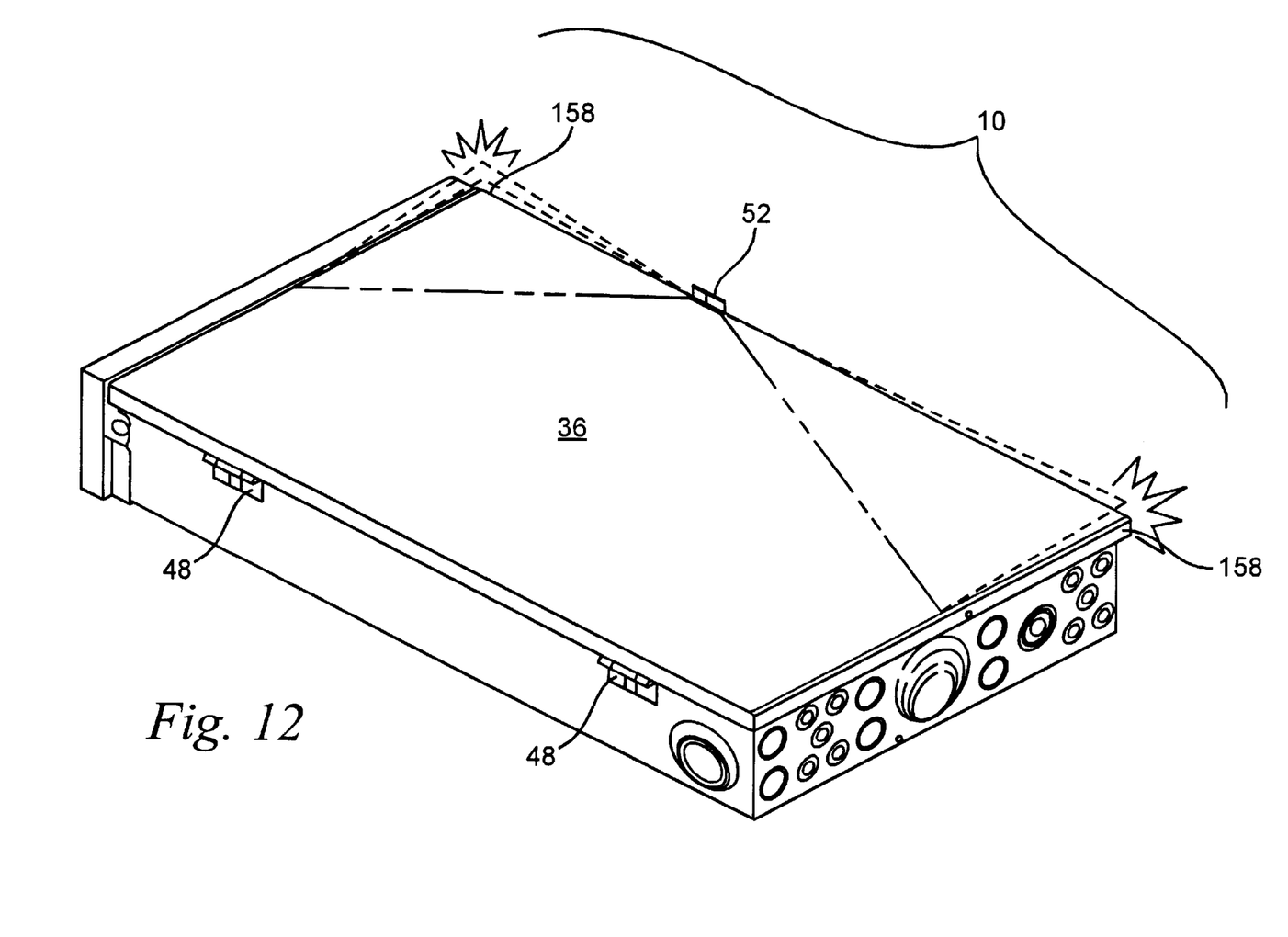
FIG. 12 is an illustration of the box with a closed and latched cover, showing the method by which internal gas pressure is permitted to escape causing only minimal damage to the cover and no significant damage to the box.

FIG. 12 illustrates how the gasses produced inside the enclosure 10 by activated circuit protection devices are permitted to escape. The gas pressure causes the corners 158 of the latched side of the cover 36 to be deflected slightly outward thereby allowing the gasses to escape. This release of internal gas pressure is intended to prevent the enclosure 10 from being damaged beyond repair due to stretching and distortion of the box top 28, bottom 32 and side walls 18 and 22. In cases of extreme pressure inside the enclosure 10, slight permanent deflection of the cover 36 can occur in the area of the comers 158. The cover 36 is provided with removable hinges 48 such that it can be easily replaced or removed for repair and reinstalled.

We claim:

1. A weatherproof enclosure for an electrical device, said enclosure comprising:
   a box having a top including a downwardly extending front flange, a bottom, a back and two side walls, said side walls being generally parallel to one another and perpendicular to said back, said side walls extending between said top and said bottom, each said side wall having a generally square notch immediately adjacent said front flange of said top, one of said side walls having at least one hinge attached thereto and the other of said side walls having a latch attached thereto;
   a rain channel being generally J-shaped in cross-section and snugly received within said generally square notches of said side walls, said rain channel extending slightly beyond an outside surface of said two side walls and being attached to said side walls by two attaching tabs;
   a substantially flat cover having a top flange, a bottom flange and two generally parallel side flanges each extending between said top and bottom flanges, each said flange extending outwardly from and being generally perpendicular to said generally flat cover, said cover being attached to said at least one hinge for rotation between an open and a closed position, said cover being maintained in said closed position by said latch; and
   said front flange of said top, said rain channel and said top flange of said cover cooperating to prevent the ingress of a liquid into said weatherproof enclosure at a junction of said cover and said top when the liquid is directed upon said junction from any angle.

2. The enclosure of claim 1 wherein said J-shaped rain channel further includes a back wall, a bottom and an upwardly extending lip, each attaching tab being integrally formed from an end of said back wall such that said attaching tabs are generally perpendicular to said back wall.

3. The enclosure of claim 2 wherein said attaching tabs overlap an outside surface of said side walls when said rain channel is snugly received within said generally square notches of said side walls.

4. The enclosure of claim 3 wherein said front flange of said top extends downwardly over a portion of said rain channel such that a gap is formed between a lower edge of said front flange of said top and said upwardly extending lip of said rain channel.

5. The enclosure of claim 4 wherein said top flange of said cover is received within said gap between said front flange of said top and said upwardly extending lip of said rain channel when said cover is in said closed position.

6. The enclosure of claim 5 wherein said rain channel can include a top flange generally parallel to said rain channel bottom and positioned immediately adjacent an inside surface of said top when said rain channel is snugly received within said generally square notches of said side walls.

7. A weatherproof enclosure for an electrical device, said enclosure comprising:
   a box having a top, a bottom, a back and two side walls, said side walls being generally parallel to one another and perpendicular to said back, said side walls extending between said top and said bottom; one of said side walls having at least one hinge attached thereto;
   a latch having a first end attached to the other of said side walls and an extended end;
   a substantially flat cover having a top flange, a bottom flange and two generally parallel side flanges extending between said top and bottom flanges, each said flange being generally perpendicular to said generally flat cover, said cover defining a latching slot immediately adjacent one of said side flanges for receiving said extended end of said latch, said at least one hinge being attached to the other of said side flanges for rotation between an open and a closed position, said cover being held in said closed position by said latch; and
   said latching slot, said latch and its associated side wall cooperating to prevent the ingress of a liquid into said weatherproof enclosure when the liquid is directed upon a junction of said latch and said latching slot.

8. The enclosure of claim 7 wherein each said latch defines an offset between said first end and said extended end, said offset having a predetermined dimension such that said extended end is spaced apart from said first end by said predetermined dimension.

9. The enclosure of claim 8 wherein each said latch is significantly rigid such that said predetermined dimension of said offset is maintained.

10. The enclosure of claim 9 wherein said latch defines at least one latching ear and at least one latching slot immediately below said latching ear, said latching ear being adjacent said extended end.

11. The enclosure of claim 10 wherein said latching slot of said cover is generally T-shaped such that a wide section and a narrow section are defined.

12. The enclosure of claim 11 wherein said latching slot slidably receives said extended end of said latch through said wide section.

13. The enclosure of claim 12 wherein said at least one latching notch in said latch slidably receives said narrow section of said latching slot such that said at least one latching ear can engage said cover adjacent said narrow section of said latching slot.

14. The enclosure of claim 13 wherein said latch is biased into said narrow section of said latching slot by said box side wall to which said latch is attached.

15. The enclosure of claim 14 wherein said predetermined dimension of said offset maintains said side wall to which said latch is attached in a position relative to said latching slot of said cover such that said latching slot does not provide access to an inside of said enclosure.

16. The enclosure of claim 7 wherein said latch is rotatably attached to said side wall such that said latch can be rotated from a shipping position in which an extended end of said latch is immediately adjacent said side wall to an operating position in which said extended end of said latch is exposed above a front edge of said side wall.

17. An enclosure for an electrical device, said enclosure comprising:
    a box having a top, a bottom, a back and two side walls, said side walls being generally parallel to one another and perpendicular to said back, said side walls extending between said top and said bottom; one of said side walls having at least one hinge attached thereto;
    a latch having a first end attached to the other of said side walls and an extended end;
    a substantially flat cover having a top flange, a bottom flange and two generally parallel side flanges extending between said top and bottom flanges, each said flange being generally perpendicular to said generally flat cover, said cover defining a latching slot immediately adjacent one of said side flanges for receiving said extended end of said latch, said at least one hinge being attached to the other of said side flanges for rotation between an open and a closed position, said cover being held in said closed position by said latch; and
    said latching slot, said latch and its associated side wall cooperating to increase a positive latching force between said latch and said cover in response to an abrupt increase in pressure inside said electrical enclosure caused by gases produced by a circuit protection device operating in response to a short circuit condition.

18. The enclosure of claim 17 wherein each said latch defines an offset between said first end and said extended end, said offset having a predetermined dimension such that said extended end is spaced apart from said first end by said predetermined dimension.

19. The enclosure of claim 18 wherein each said latch is significantly rigid such that said predetermined dimension of said offset is maintained.

20. The enclosure of claim 19 wherein said latch defines at least one latching ear and at least one latching slot immediately below said latching ear, said latching ear being adjacent said extended end.

21. The enclosure of claim 20 wherein said latching slot of said cover is generally T-shaped such that a wide section and a narrow section are defined.

22. The enclosure of claim 21 wherein said latching slot slidably receives said extended end of said latch through said wide section.

23. The enclosure of claim 22 wherein said at least one latching notch in said latch slidably receives said narrow section of said latching slot such that said at least one latching ear can engage said cover adjacent said narrow section of said latching slot.

24. The enclosure of claim 23 wherein said latch is biased into said narrow section of said latching slot by said box side wall to which said latch is attached.

25. The enclosure of claim 24 wherein an increase of gas pressure inside said electrical enclosure, being incident upon an inside surface of said box side wall to which said latch is attached causes said side wall to increase the bias on said latch thereby increasing said positive latching force between said latch and said cover.

26. A weatherproof enclosure for an electrical device, said enclosure comprising:
    a box having a top including a downwardly extending front flange, a bottom, a back and two side walls, said side walls being generally parallel to one another and perpendicular to said back, said side walls extending between said top and said bottom, each said side wall having a generally square notch immediately adjacent said front flange of said top, one of said side walls having at least one hinge attached thereto;
    a latch having a first end attached to the other of said side walls and an extended end;
    a rain channel being generally J-shaped in cross-section and snugly received within said generally square notches of said side walls, said rain channel extending slightly beyond an outside surface of said two side walls;
    a substantially flat cover having a top flange, a bottom flange and two generally parallel side flanges extending between said top and bottom flanges, each said flange extending outwardly from and being generally perpendicular to said generally flat cover, said cover defining a latching slot immediately adjacent one of said side flanges for receiving said extended end of said latch, said at least one hinge being attached to the other of said side flanges for rotation between an open and a closed position, said cover being held in said closed position by said latch;
    said front flange of said top, said rain channel and said top flange of said cover cooperating to prevent the ingress of a liquid into said weatherproof enclosure at a junction of said cover and said top when the liquid is directed upon said junction from any angle; and
    said latching slot, said latch and its associated side wall cooperating to prevent the ingress of the liquid into said weatherproof enclosure, the liquid being directed upon a junction of said latch and said latching slot.

* * * * *